Patented July 14, 1931

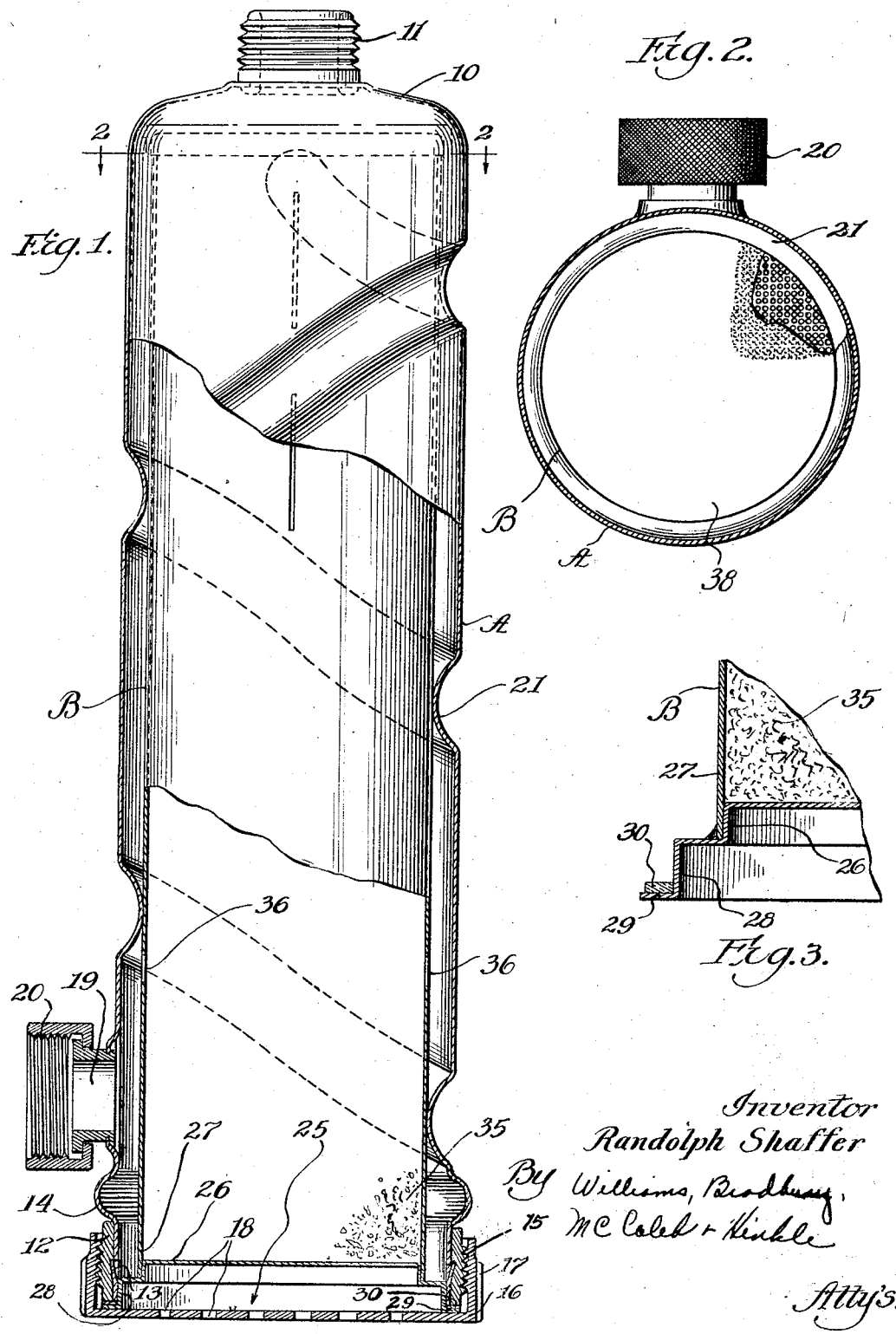

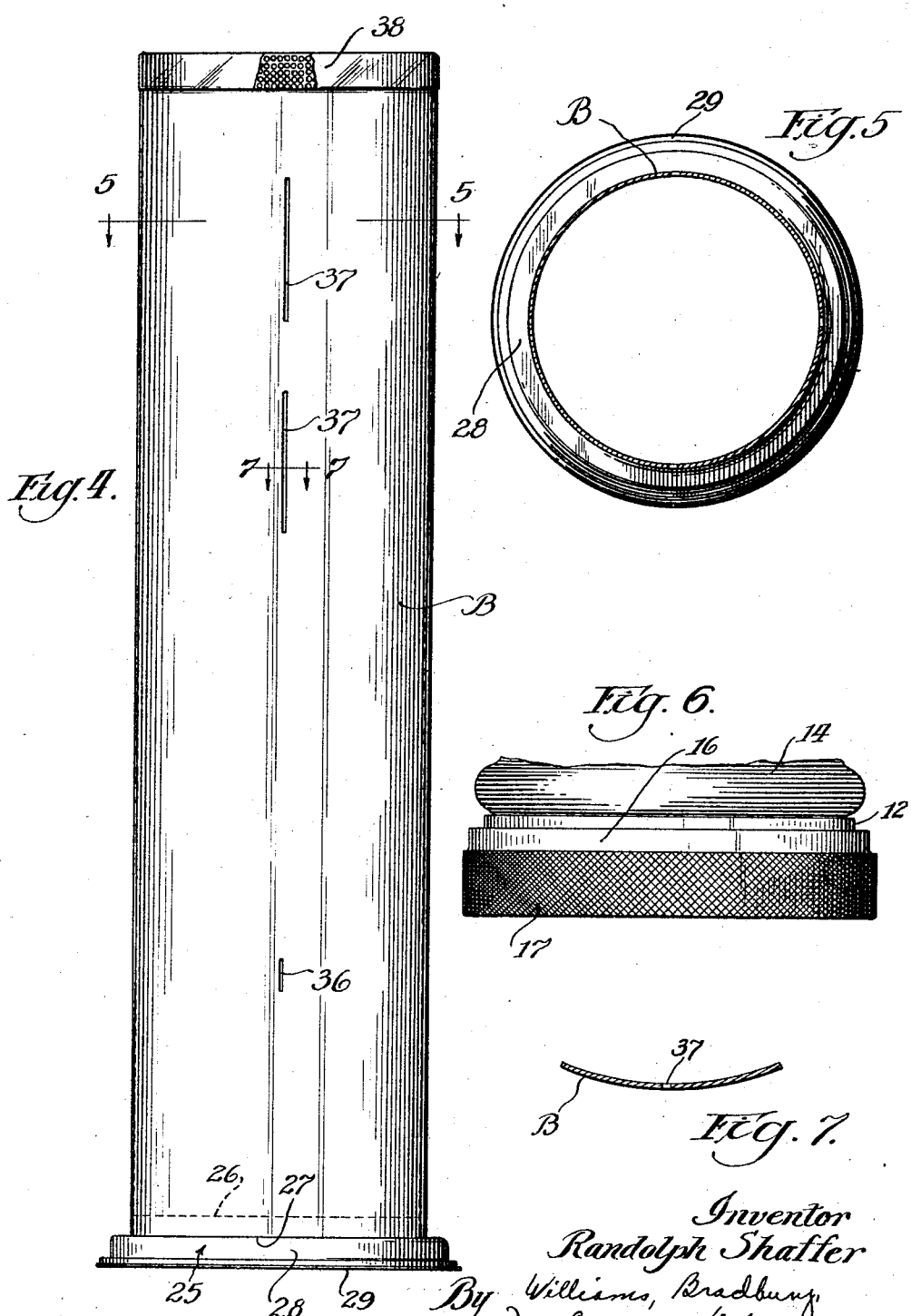

1,814,573

UNITED STATES PATENT OFFICE

RANDOLPH SHAFFER, OF EVANSTON, ILLINOIS

FERTILIZER DISPENSING DEVICE

Application filed February 18, 1928. Serial No. 255,223.

My invention relates to improvements in fertilizer dispensing devices. The invention will be explained as embodied in a fertilizer dispensing device of a portable type intended for use in connection with the ordinary garden or watering hose.

The present invention is an improvement over the fertilizer dispensing device illustrated and described in my copending application for patent, Serial No. 217,617, filed September 6, 1927, and has certain features in common therewith. As to such common features the present application is a continuation of the aforesaid application, Serial No. 217,617.

While the device is primarily intended for the dispensing of fertilizing ingredients, it may be used with equal success for dispensing poisons, insecticides, fire extinguishing chemicals, or like water soluble materials which are herein considered to be embraced with the term fertilizer.

One of the objects of the invention is to provide an improved fertilizer dispensing device.

Another object is to provide an improved fertilizer dispensing device in the form of a shell or container, adapted to be connected to a water sprinkling system, and a cartridge holding the soluble ingredients, insertable into the container where the water is brought into contact with the soluble ingredients.

Another object is to provide a solution dispenser which will discharge a solution of substantially uniform strength throughout the life of a cartridge.

Another object is to provide a dispenser which will discharge a substantially uniform solution regardless of variations in water pressure.

Another object is to provide a fertilizer dispensing device in which the soluble material is uniformly dissolved starting with the remote end of the cartridge containing the material toward that end near the discharge outlet of the device.

Another object is to provide a fertilizer dispensing device in which novel means is employed for successively subjecting various portions of the cartridge to water as it flows through the casing.

Another object is to provide a fertilizer dispensing device in which one end of the cartridge co-acts with the shell or outer casing to accurately center and position the cartridge within the shell.

Another object is to provide a fertilizer dispensing device in which the cartridge is so constructed as to prohibit the improper introduction of the cartridge to the casing.

Another object is to provide a fertilizer dispensing device in which the cartridge and casing are so constructed that upon attempted operation of the device without the cartridge properly in place, water will be emitted through perforations formed in the cap and thus indicate to the user the absence or improper seal of the cartridge therein.

Another object is to provide an improved refill or cartridge which contributes to securing uniformity of solution.

Another object is to provide a container and refill cartridge which are simple, dependable and inexpensive.

Other objects and advantages of my invention will appear more fully from the following description and from the accompanying drawings in which similar reference characters indicate similar parts throughout the several views.

In the drawings

Figure 1 is a side elevation partially in section of the fertilizer dispensing device;

Figure 2 is a sectional view along the line 2—2 of Figure 1;

Figure 3 is an enlarged sectional view of a part of the device illustrated in Figure 1;

Figure 4 is a side elevation of the cartridge or refill;

Figure 5 is a sectional view along the line 5—5 of Figure 4;

Figure 6 is a fragmentary view of one end of the device;

And Figure 7 is a sectional view along the line 7—7 of Figure 4.

In general, the fertilizer dispenser comprises a metal shell or container A through which water is permitted to flow and a refill cartridge B containing readily soluble fertilizer ingredients disposed within the shell for impregnating the water stream with the ingredients.

Shell A is closed at its outer end by curved head 10 having a discharge opening communicating with an externally threaded neck 11. Neck 11 is constructed for connection with the ordinary type of hand sprinkler nozzle or to a length of hose having a nozzle or other sprinkler at its opposite end.

The opposite end or base of shell A is open and has a rigid ring 12 there-about and fixed to the shell by an integral locking lug or tongue 13 punched therefrom which serves to prevent lateral movement of ring 12 in one direction. An externally rolled bead 14 formed in the shell adjacent to the rear end of the ring prevents lateral movement of the ring in the opposite direction and further serves as a protection to external threads 15 formed on the ring as when the shell is lying upon its side with its cap 16 removed.

Cap 16 is of rigid material provided with internal threads for engaging with threads 15 of ring 12. The peripheral edge 17 of cap 16 is knurled to facilitate placement and removal of the cap. Cap 16 is further provided with a plurality of perforations 18 for the purpose hereinafter described.

Shell A has an inlet orifice 19 in the side thereof adjacent to the bead 14 and is provided with a rotatable internally threaded hose coupling 20, by means of which the shell may be connected with a garden hose or like water supply conduit.

An inwardly extended rolled spiral bead or vane 21 is formed in shell A extending from bead 14 to head 10. The bead 21 is of sufficient depth as to form a spiral passage between cartridge B and shell A so that water passing through the shell will move over the entire surface of the cartridge B before it is discharged through outlet neck 11.

Means for supporting and positioning cartridge B within shell A and for sealing the base of the end of the shell consists in a closure disc 25 having a depressed part 26 disposed and fixed within one end 27 of the cartridge and an enlarged part 28 for engaging with the side walls of the open end of shell A. Disc 25 is further fashioned with a flange 29 for disposition between cap 16 and the outer end of ring 12. To effect a water tight seal I provide a gasket 30 between flange 29 and ring 12.

Cartridge B includes a foraminous cylindrical shell 31 of suitable relatively insoluble material, such as thin sheet metal. This cartridge contains a salt 35 known as urea, which is highly soluble in water and which contains large quantities of nitrogen. Various other water soluble materials may be used in place of the urea 35 depending upon the purpose for which the device is intended. In order to protect the highly soluble ingredients from atmospheric moisture or other conditions which might dissolve, destroy or deteriorate them before the cartridges are used but still permit the ingredients to be attacked and dissolved by the water flowing through the container when the device is in use, I provide a normally stable but water soluble filler or covering for the cartridge shell foramina. This soluble closure for the shell foramina has a varying characteristic at different portions of the cartridge shell to insure a difference in the time of opening or uncovering the foramina to the passage of water therethrough and thereby effect a progressive dissolution of the soluble fertilizer ingredients contained in the shell. I will now explain how this result is accomplished.

A pair of diametrically opposed, relatively short, narrow slots 36 is provided in the wall of cartridge B about a quarter of the way from the inner or base end. These slots are filled with a readily soluble material, such as hydrolyzed glue composed of ninety parts by weight of commercial glue and ten parts by weight of glycerin.

A plurality of relatively long slots 37 are provided in the walls of the cartridge B at the outer end and arranged in spiral formation. These slots 37 are filled with a slowly soluble material, such as a low test hide glue 500 parts by weight, water 100 parts by weight and glycerin 125 parts by weight.

The outer end of the cartridge consists of a perforated cap 38, the perforations being filled with the same substance used to fill slots 37.

In operation, shell A is connected by coupling 20 to a water supply faucet or water hose such as a garden hose and by threaded neck 11 directly or through a length of hose to a nozzle or other water distributing device. When the water is turned on it will pass through shell A in a spiral path over the entire surface of cartridge B. Gasket 30 and disc 25 prevent the escape of water through the perforations 18 in cap 16.

The glue filling slots 36 will be dissolved almost immediately upon contact of the water therewith, whereupon the water may become impregnated with the highly soluble urea and will continue its course through shell A for ultimate discharge through the nozzle or other water distributing device.

The first access of water to the contents of cartridge B is purposely brought about through the relatively small openings or short slots 36 because of the fact that the water first dissolves the small particles of urea and also due to the fact that the urea when first subjected to the water and while still dry has a great affinity for water. This initial dissolution of the urea takes place so rapidly that it is only necessary to subject a small part of the water stream to the material for the proper impregnation of the entire stream. During the course of movement of the water through shell A the solution becomes thoroughly mixed, with the result that a uniformly charged water stream is distributed through the nozzle of the water distributing device.

After the urea has first been subjected to the action of the water and after the initial dissolution of the more readily soluble parts of the urea, the glue filling the openings of the longer slots 37 and the perforated cap 38 becomes dissolved the water stream thereupon receives its charge through these slots and perforations. Thus a greater quantity of water is permitted to come into direct contact with the decreasing surface area of the urea as it dissolves thereby resulting in a substantially uniformly impregnated water stream.

I have found by experiment that the relative sizes and arrangements of the slots 36, 37 and the perforations in the cap 38 herein illustrated and described serve to bring about a substantially uniform impregnation of the water stream.

After the contents of cartridge B is entirely consumed, the water may be turned off and the cap 16 removed. This permits the cartridge shell to be withdrawn from container A and a fresh cartridge substituted therefor.

Should the water pressure vary, the quantity of fertilizer ingredients in a given volume of water discharge from the outlet of the container (i. e. the strength of the solution dispensed) will remain substantially constant due to the fact that the helical path through which the water travels builds up in the water stream within the container centrifugal force increasing with increased pressure which tends to throw the water toward the inner wall of container A and decreases somewhat the tendency of water to enter through the foramina of the cartridge shell. Despite the action of centrifugal force in keeping the high pressure stream away from the cartridge, the higher water pressure and the higher velocity of the flow of water will effect dissolution of the fertilizer ingredients at a rate substantially correct for the increased flow of water, that is, relatively about the same as that for the smaller flow of water at the lower pressure. Another factor which contributes to the desired result is the fact that the more rapidly flowing water will more readily dissolve the normally stable but water soluble covering or filling of the cartridge foramina and thereby will increase the rapidity with which the fertilizer may be attacked by the water and dissolved.

The combination of the helical path for the water with the action of centrifugal force and the ability to give the foramina filler a varying characteristic at different regions of the cartridge puts it within the control of the manufacturer to adjust the richness or concentration of the water and fertilizer mixture delivered from the device in such a way that it will in a large measure adjust itself to varying water pressures and will remain substantially uniform until a cartridge is exhausted.

If, by any chance, the cap 16 is replaced without the cartridge within the shell and the water turned on, the water will pass through perforations 18 in cap 16, thus immediately indicating to the operator that he has neglected to place a cartridge therein or that the cartridge is improperly placed in the shell. I have thus provided visible means for indicating to the operator whether the cartridge is in a proper position within the shell to function efficiently or whether the cartridge has been entirely omitted.

I claim:

1. In a device for producing solutions the combination of a casing having an inlet and an outlet, a cartridge in the casing, water soluble material in the cartridge, said cartridge having longitudinally spaced perforations therethrough, and water soluble material closing said perforations, the material in certain of said perforations being more highly soluble than that in other of said perforations.

2. In a device for producing solutions the combination of a casing having an inlet and an outlet, a cartridge in the casing, water soluble material in the cartridge, said cartridge having perforations therethrough in its side walls the perforations at one end of the cartridge adjacent the inlet of the casing being smaller in total area than the perforations adjacent the outlet end of the casing, and a normally stable but water soluble filler for the cartridge perforations.

3. In a device for producing solutions the combination of a casing having an inlet and an outlet, a cartridge in the casing, water soluble material in the cartridge, said cartridge having perforations therethrough in its side walls the perforations at one end of the cartridge adjacent the inlet of the casing being smaller in area than the perforations adjacent the outlet end of the casing, and water soluble material closing the perforations, the material for closing certain of the perforations being more highly soluble than the material used to close other of the perforations.

4. In a device for producing solutions, the combination of a casing having an inlet and an outlet, a cartridge in the casing, water soluble material in the cartridge, said cartridge having perforations therethrough in its side walls, the perforations at one end of the cartridge adjacent the inlet of the casing being smaller in area than the perforations adjacent the outlet end of the casing, and water soluble material closing the perforations adjacent the outlet end of the casing and other water soluble material having a relatively high degree of solubility for closing the perforations adjacent to the inlet end of the casing.

5. In a device for producing solutions, the combination of a casing having an inlet and an outlet, a cartridge disposed within the casing, a spiral vane between the inner wall of the casing and the outer wall of the cartridge, said cartridge having a plurality of perforations through the side walls thereof, and water soluble material closing the perforations in the cartridge, the material for closing those perforations adjacent the inlet end of the casing being more highly soluble than the material employed for closing the perforations adjacent the outlet end of the casing.

6. In a device for producing solutions, the combination of a casing having an inlet and an outlet, a cartridge disposed within the casing, water soluble material in the cartridge, and a plurality of narrow slots through the cartridge extending longitudinally thereof, the slots adjacent the inlet end of the casing being shorter than those adjacent the outlet end of the casing, and a water soluble material for closing the perforations, that material used to close the perforations adjacent the inlet end of the casing being more highly soluble than the material used to close the remainder of the perforations.

7. A cartridge for insertion in a solution dispensing casing having water inlet and outlet connections, comprising a relatively insoluble foraminous shell for holding the soluble ingredient, said shell being insertable in and removable from the casing and having the area of its perforations adjacent the casing inlet less than the area of the perforations adjacent the casing outlet, and a water soluble but normally stable material closing the perforations in the shell, the material used to close the perforations adjacent the inlet of the casing being more highly soluble than the material used to close the perforations adjacent the casing outlet.

8. A fertilizer dispensing device comprising a tubular casing having an inlet and an outlet whereby liquid may be passed therethrough; a spiral vane formed in the wall of the casing between the inlet and outlet thereof; and a soluble fertilizer ingredient containing cartridge for application to the casing, said cartridge including a foraminous insoluble shell fitting within the vanes of the casing, a highly soluble fertilizer within the shell, and a normally stable water soluble filler for the shell foramina, the filler for the foramina near the inlet being relatively more soluble than the filler for the foramina near the outlet.

9. A refill cartridge for a solution dispensing device comprising a foraminous insoluble shell, water soluble material in the shell, and a normally stable but water soluble filler for the shell foramina to protect the material in the shell against atmospheric moisture but permit it to be attacked by water, the filler for the foramina varying in solubility in different regions of the shell to effect a difference in the time of opening the foramina to water.

10. In a device for producing solutions, the combination of a casing having an inlet and an outlet, a perforated cartridge, water soluble material in the cartridge, means associated with the cartridge and with the casing for sealing the cartridge within the casing when fully projected therein, and a spiral vane between the inner wall of the casing and the outer wall of the cartridge.

11. In a device for producing solutions the combination with a casing having an inlet and an outlet, a perforated removable cartridge disposed within the casing, water soluble material in the cartridge, a spiral vane formed in the side walls of the casing and contacting the outer walls of the cartridge throughout the entire length thereof, and means for sealing the cartridge within the casing.

12. A fertilizer dispensing device comprising a tubular casing having an inlet and an outlet whereby liquid may be passed therethrough, one end of the casing being open for the insertion and removal of a cartridge containing soluble fertilizer ingredients; a spiral vane formed in the wall of the casing between the inlet and outlet thereof; and a soluble fertilizer ingredient containing cartridge for application to the casing, said cartridge including a foraminous insoluble shell fitting within the vanes of the casing, a highly soluble fertilizer within the shell, and a normally stable water soluble filler for the shell foramina, the filler having a varying characteristic at different portions of the shell to insure the opening of foramina in the region of the inlet sooner than in the region of the outlet.

13. A device for producing solutions comprising a tubular casing having inlet and outlet connections whereby water may be passed therethrough; and an insertable and removable cartridge for the casing, said cartridge comprising a foraminous insoluble shell, a highly soluble fertilizer in the shell, and a normally stable and water soluble filler for the shell foramina, the filler having a varying characteristic at different portions of the shell to insure opening of foramina in the region of the outlet later than in the region of the inlet.

14. A fertilizer cartridge comprising a foraminous shell of relatively insoluble material, a relatively soluble fertilizer material in the shell, and a normally stable but soluble closure for the shell foramina, said soluble closure having a varying characteristic at different portions of the shell to effect a difference in the time of uncovering the foramina.

15. In a device for producing solutions the combination of a perforated cartridge shell, water soluble material in the shell, and a normally stable but water soluble filler for the shell perforations, said filler having a varying characteristic at different portions of the shell to insure a difference in the time of uncovering the perforations.

16. A refill cartridge for a fertilizer dispensing device comprising a foraminous insoluble shell for holding readily soluble fertilizer ingredients, and a normally stable but soluble closure for the shell foramina to protect the ingredients from atmospheric moisture but permit them to be dissolved by water, said soluble closure having a varying characteristic at different regions of the shell to effect a difference in the time of opening the foramina to water.

17. A refill cartridge for a solution dispensing device comprising a foraminous insoluble shell for holding highly soluble ingredients, and a filler for the shell foramina to protect the ingredients from atmospheric moisture but permit them to be attacked by water, said filler being normally stable and water soluble and having a varying characteristic at different regions of the shell to insure a difference in the time of opening the foramina to the passage of water.

18. A device for dispensing soluble fertilizer and the like having in combination a tubular casing provided with an inlet adjacent one end and an outlet adjacent the other end; a cartridge for insertion within the casing, said cartridge comprising a foraminous insoluble tubular shell, the total area of the shell foramina adjacent the outlet end of the casing being substantially greater than the total area of the shell foramina adjacent the inlet end of the casing, and a water soluble fertilizer material in the shell; and means for closing all but the casing inlet and outlet and holding the cartridge in position in the casing.

19. A fertilizer refill cartridge for a tubular fertilizer dispensing casing said casing being equipped with a water inlet adjacent one end and a water outlet adjacent the other end, and said cartridge comprising a foraminous insoluble shell, the total area of foramina adjacent the end of the shell adjacent the outlet of the casing when the cartridge is therein being substantially greater than the total area of the foramina adjacent the opposite end of the cartridge, and a readily water soluble fertilizer material within the cartridge shell.

In witness whereof, I hereunto subscribe my name this 6th day of February, 1928.

RANDOLPH SHAFFER.